(No Model.)
A. GERSTNER.
WHEEL TIRE.
No. 558,644. Patented Apr. 21, 1896.
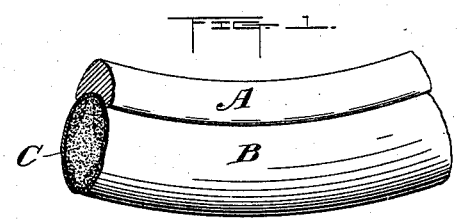
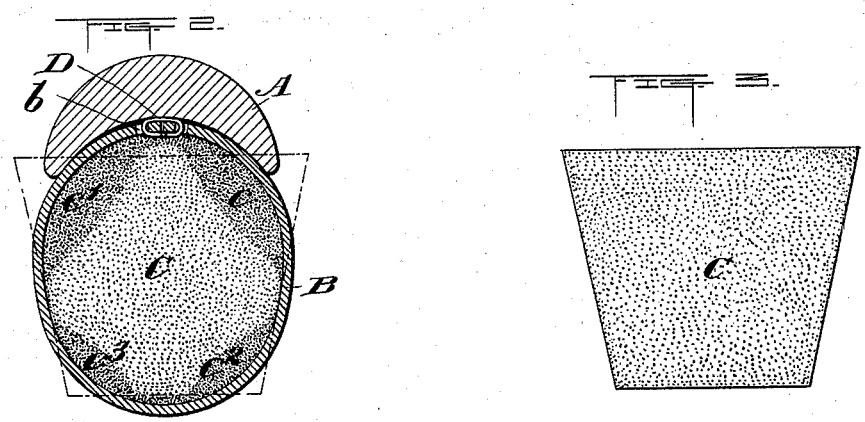
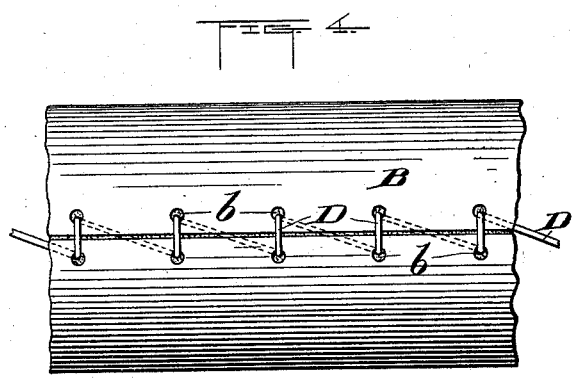
Witnesses.
R. B. Seward.
George Barry Jr.
Inventor.
August Gerstner,
by attorneys. Brown & Seward

UNITED STATES PATENT OFFICE.

AUGUST GERSTNER, OF BROOKLYN, NEW YORK.

WHEEL-TIRE.

SPECIFICATION forming part of Letters Patent No. 558,644, dated April 21, 1896.

Application filed January 21, 1896. Serial No. 576,294. (No model.)

*To all whom it may concern:*

Be it known that I, AUGUST GERSTNER, of Brooklyn, in the county of Kings and State of New York, have invented a new and useful Improvement in Wheel-Tires, of which the following is a specification.

My invention relates to an improvement in wheel-tires in which a flexible outer casing or tread is supported by a filling of elastic material.

A practical embodiment of my invention is represented in the accompanying drawings, in which—

Figure 1 is a view in side elevation of a portion of the tire attached to the rim. Fig. 2 is an enlarged transverse section through the rim and tire, showing in dotted lines the position which the filling material assumed in cross-section before it was compressed by the flexible casing. Fig. 3 is a view in detail, showing a transverse section of the filling as it appears before being compressed within the casing; and Fig. 4 is an enlarged view of a portion of the casing, showing the lacing along the meeting edges of the casing.

The particular form of wheel-rim which I have chosen to illustrate the application of the tire is that which is commonly used in connection with a bicycle or velocipede wheel; but it is to be understood that the tire may be employed in connection with any vehicle-wheel where a cushion or yielding tire is desired.

The wheel-rim is denoted by A, the casing of the tire by B, and the filling by C. The casing is shown as provided with perforations $b$ for receiving a lacing-cord D, as is common.

The filling which I propose to employ is felt—such, for example, as that commonly employed in piano-actions—and is preferably made in one continuous bar having a cross-section in the form of a vertical section of the frustum of a cone. This section is made of such area with respect to the size of the casing as to require the compression of its corners in order to surround it by the casing, and this compression at the corners becomes an important factor in the shape of the tire and in the firmness with which it resists lateral pressure while admitting of a very lively pressure in a radial direction.

Referring more particularly to the cross-section represented in Fig. 2, it will be observed that when the corners of the cross-section of the filling are compressed by drawing the casing around the filling the incased filling will be compressed to the greatest extent at the points where lateral strain is exerted upon the edges of the rim A, thereby preventing the tire from liability to fold over the edge of the rim, and it will also compress the material upon the opposite sides of the center of the normal bearing portion of the tire, so as to resist undue flattening of the bearing-face of the tire when the latter assumes the slanting position, as in turning corners. It will be further observed that while the interior mass is compressed to firmness at these desirable points above mentioned it is still left free to yield readily to weight along the center of its bearing-face, so as to make it what is commonly known in the art as a "lively tire" and responsive to pressure.

The cross-section of the tire will assume a general circular or slightly oval shape under the strain of the casing drawn around the felt, because of the tendency of the filling to occupy the greatest possible area under compression with a given length of circumference, which form is, as is well known, the circular form.

The compressed portions of the filling opposite the edges of the rim are denoted by $c$ $c'$ and those in proximity to its outer face by $c^2 c^3$, the darker shading being utilized to represent the more compressed portions of the filling and the lighter shading the lesser compressed portion.

The particular means of securing the casing around the filling is one of many well-known means which may be employed, and the casing itself may be of any well-known or approved material—such, for example, as rubber, leather, or canvas.

The tire as thus constructed is light and resilient, and no harm comes to it from receiving punctures from nails, pins, or other sharp-pointed articles, which at the present time give such great annoyance.

The inclosed filling may be cemented or otherwise secured to the rim A in any well-known or approved manner.

In using the word "felt" in the specification and claims of this application I wish to be understood as including all those forms of fibrous material which in their nature correspond to what is commonly called in the art "felt."

What I claim is—

1. A wheel-tire comprising an exterior casing of suitable flexible material and a compressed filling of felt, the said filling being compressed to a greater extent at predetermined intervals along the margin of its cross-section than at intermediate intervals, substantially as set forth.

2. The wheel-tire comprising an exterior flexible casing of suitable material and an inner filling composed of felt the shape of the normal cross-section of the incased filling being substantially the vertical section of the frustum of a cone, substantially as set forth.

AUGUST GERSTNER.

Witnesses:
FREDK. HAYNES,
IRENE B. DECKER.